United States Patent
Schlegelmilch et al.

(10) Patent No.: US 11,828,363 B2
(45) Date of Patent: Nov. 28, 2023

(54) METHOD FOR CONTROLLING THE ENGAGEMENT AND/OR DISENGAGEMENT OF A PARKING LOCK OF A TRANSMISSION OF A VEHICLE, IN PARTICULAR OF A MOTOR VEHICLE

(71) Applicant: Volkswagen Aktiengesellschaft, Wolfsburg (DE)

(72) Inventors: Dirk Schlegelmilch, Wolfsburg (DE); Fabian Meyer, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 95 days.

(21) Appl. No.: 17/673,252

(22) Filed: Feb. 16, 2022

(65) Prior Publication Data

US 2022/0170545 A1 Jun. 2, 2022

Related U.S. Application Data

(63) Continuation of application No. PCT/EP2020/072357, filed on Aug. 10, 2020.

(30) Foreign Application Priority Data

Aug. 16, 2019 (DE) .......................... 102019212319.8

(51) Int. Cl.
*F16H 63/34* (2006.01)
(52) U.S. Cl.
CPC ..... *F16H 63/3491* (2013.01); *F16H 63/3483* (2013.01)
(58) Field of Classification Search
CPC ......... F16H 2059/446; F16H 2059/663; F16H 59/04; F16H 61/20; F16H 2061/205;

(Continued)

(56) References Cited

U.S. PATENT DOCUMENTS 6,881,175 B2 4/2005 Loibl
9,694,791 B2 7/2017 Kamo
(Continued)

FOREIGN PATENT DOCUMENTS

DE 102004047100 B3 3/2006
DE 102005005669 A1 8/2006
(Continued)

OTHER PUBLICATIONS

International Search Report dated Oct. 26, 2020 in corresponding application PCT/EP2020/072357.

*Primary Examiner* — Lori Wu
(74) *Attorney, Agent, or Firm* — Muncy, Geissler, Olds & Lowe , P.C.

(57) ABSTRACT

A method for controlling an engagement and disengagement of a vehicle transmission parking lock. A vehicle present speed is ascertained when a device for activating the parking lock is actuated. When the vehicle has not yet reached a standstill and the present speed exceeds a threshold value, engagement of the parking lock is prevented. When the vehicle has not yet reached a standstill and the present speed falls below the threshold value, the vehicle activates the parking brake and is braked until the standstill is reached or until the present speed has reached substantially zero. A present gradient value of the roadway and/or a vehicle longitudinal inclination value is also ascertained. Based on these values, it is checked whether a hydraulic brake system of the vehicle is activated or whether the already activated parking brake should be deactivated.

11 Claims, 2 Drawing Sheets

(58) Field of Classification Search
CPC .... F16H 63/006; F16H 63/34; F16H 63/3486;
F16H 2312/04; B60T 1/005; B60T 1/062;
B60T 7/122; B60T 2201/06
See application file for complete search history.

(56) References Cited

U.S. PATENT DOCUMENTS

| | | | |
|---|---|---|---|
| 2010/0197456 A1* | 8/2010 | Steinhauser | F16H 63/483 |
| | | | 477/92 |
| 2016/0355165 A1* | 12/2016 | Förster | B60T 7/122 |
| 2018/0043895 A1* | 2/2018 | Shami | B60W 10/184 |
| 2020/0391707 A1* | 12/2020 | Hollowell | B60T 7/12 |

FOREIGN PATENT DOCUMENTS

| | | |
|---|---|---|
| DE | 102005046278 B4 | 4/2008 |
| DE | 102013009747 A1 | 12/2014 |
| DE | 112013005271 T5 | 10/2015 |
| EP | 1292473 B1 | 2/2008 |

* cited by examiner

METHOD FOR CONTROLLING THE ENGAGEMENT AND/OR DISENGAGEMENT OF A PARKING LOCK OF A TRANSMISSION OF A VEHICLE, IN PARTICULAR OF A MOTOR VEHICLE

This nonprovisional application is a continuation of International Application No. PCT/EP2020/072357, which was filed on Aug. 10, 2020, and which claims priority to German Patent Application No. 10 2019 212 319.8, which was filed in Germany on Aug. 16, 2019, and which are both herein incorporated by reference.

BACKGROUND OF THE INVENTION

Field of the Invention

The present invention relates to a method for controlling the engagement and/or disengagement of a parking lock of a transmission of a vehicle, in particular of a motor vehicle.

The invention further relates to a method for controlling the engagement and/or disengagement of a parking lock of a transmission of a vehicle, in particular of a motor vehicle.

Description of the Background Art

In the prior art, a variety of methods for controlling the engagement and/or disengagement of a parking lock of a transmission of a vehicle, in particular of a motor vehicle, are known.

The corresponding motor vehicles generally have a parking lock, a parking brake, and a control unit, wherein the parking lock can be actively engaged or disengaged in particular by means of at least one activatable parking lock actuator in the transmission, in particular in an automatic transmission. By actively engaging the parking lock in the transmission, the vehicle can then be secured against unintentionally rolling away and/or against unintentional onward travel, in particular if the neutral position (N) is engaged in the transmission. The driver, who has the desire to secure the vehicle against unintentionally rolling away and/or against unintentional onward travel, can then manually actuate a device for activating the parking lock, in particular a parking lock button and/or a selector lever, in particular a parking lock button present on a selector lever, or move the selector lever to the appropriate parking position "P".

Furthermore, corresponding vehicles, in particular motor vehicles, have at least one device for activating a parking brake, in particular at least one parking brake button, a so-called "EPB button". If the device for activating a parking brake, in particular the parking brake button (EPB button), is actuated/activated by the driver, the parking brake is engaged, or the parking brake function of the vehicle is implemented.

Furthermore, the motor vehicles known in the prior art have corresponding control units, in particular for controlling the active engagement and disengagement of the parking lock in the transmission. Corresponding driving parameters of the vehicle are transmitted to the control unit. In particular, at least one present determined first driving parameter is transmitted to the control unit and/or said parameter is ascertained and/or calculated by the control unit using appropriate sensors. Preferably, however, present values of multiple determined driving parameters are transmitted to the control unit and/or ascertained and/or calculated by the control unit, such as the vehicle speed, the vehicle acceleration, the road gradient or the road decline and/or the longitudinal inclination of the vehicle, the load state of the vehicle, the manual actuation (activation/deactivation) of appropriate buttons, the operation of the accelerator pedal and/or brake pedal (or the like).

DE 10 2004 047 100 B3 describes a method for controlling the engagement and/or disengagement of a parking lock in the transmission of a motor vehicle, in which the present vehicle speed of the vehicle is ascertained as a determined first driving parameter, wherein then, if the driver actuates the device for activating the parking lock and the present vehicle speed is greater than zero, the vehicle continues to be braked by means of the parking brake before the parking lock is actively engaged in the transmission. In the method already known here in the prior art, the parking brake is therefore used before the parking lock is actively engaged in the transmission, i.e., is activated by the electronic control unit at least until it is determined that the vehicle speed has dropped below a threshold or, in particular, until it has been determined that the vehicle has reached a standstill. In other words, the vehicle continues to be braked by means of the parking brake before the parking lock is actively engaged in the transmission.

However, the method known in the prior art, or the motor vehicle operated by this method, is not yet optimized.

Actively engaging a, in particular electrically controlled, parking lock in a freely movable or rollable vehicle can lead to damage to the parking lock mechanism if the vehicle "rolls into" the locking mechanism (pawl). In addition, the locking element (pawl) can interlock, which can require a higher use of force when it is next released, i.e., when the parking lock is actively disengaged, and can result in an uncomfortable jolt during disengagement.

In the method known in the prior art (DE 10 2004 047 100 B3), the vehicle now continues to be braked before the parking lock is actively engaged in the transmission, i.e., the vehicle speed is further lowered or reduced, specifically by means of the activated parking brake (i.e., the emergency brake).

Nevertheless, it is possible that in the method described here, the vehicle, should it be standing on an inclined roadway, "rolls into" an already actively engaged parking lock if the vehicle has not yet reached its standstill yet has already fallen below the vehicle speed threshold determined here. If the parking brake is actively engaged in the transmission and if the driver manually deactivates the parking brake to start driving, the vehicle can "roll into" the parking brake still actively engaged due to the road gradient, which can lead to the problems described above. The method known in the prior art is therefore not yet optimally developed.

SUMMARY OF THE INVENTION

It is therefore an object of the present invention to design and further develop the aforementioned method in such a way that on the one hand, driving comfort for the driver is increased and/or, on the other hand, risk of damage and/or wear to the parking lock is reduced.

The features of the invention can be implemented and/or realized individually, but also suitably combined. This may already be pointed out at this point.

The present gradient of the road and/or the longitudinal inclination of the vehicle is now ascertained and/or calculated as a second driving parameter, wherein, on the basis of the ascertained gradient value and/or the ascertained longitudinal inclination of the vehicle it is determined and/or checked whether a hydraulic brake system of the vehicle is activated. Expressed differently, in the first example of the method, the hydraulic brake system of the vehicle is activated before the parking lock in the transmission is automatically actively engaged. This ensures that the vehicle is prevented from rolling into the parking lock if the vehicle is standing on an inclined roadway or has a corresponding longitudinal inclination.

In particular, in the event that the vehicle speed is substantially zero and/or the vehicle is at a standstill and the amount of the ascertained gradient value and/or ascertained inclination value falls below the amount of a determined first inclination threshold value, the hydraulic brake system is automatically activated, in particular for a maximum of 2 seconds. After that, the parking lock in the transmission is automatically engaged. This has the advantage that with, in particular, low road gradients or longitudinal inclinations of the vehicle, the latter is secured by means of the hydraulic brake system. After activation of the hydraulic brake system, the parking lock is automatically actively engaged in or on the transmission.

After the active engagement of the parking lock, the hydraulic brake system is automatically deactivated again. The vehicle is then secured against rolling away by the actively engaged parking lock. In particular, no parking brake has to be automatically activated to further prevent the vehicle from rolling away.

In the event that the vehicle speed is substantially zero and/or the vehicle is at a standstill and the amount of the ascertained gradient value and/or ascertained inclination value exceeds the amount of an ascertained first gradient threshold value, then the parking brake can be automatically activated. This serves in particular to further secure the vehicle against unintentionally rolling away, i.e., a further inventive method can then also be carried out in accordance with a further second example, which will be further explained in the following.

Thus, the present gradient of the roadway and/or the longitudinal inclination of the vehicle is now ascertained and/or calculated as a second driving parameter, wherein based on the ascertained gradient value and/or the ascertained longitudinal inclination value of the vehicle it is decided and/or checked whether an already activated parking brake can be deactivated again by the driver, in particular whether it can be manually deactivated again.

The parking brake is therefore initially automatically activated, in particular in order to possibly continue to brake the vehicle to a standstill before the parking lock is actively engaged in the transmission. If the vehicle then reaches a standstill or if the vehicle speed is substantially zero, the parking lock is actively engaged in the transmission.

In the event that the parking brake is already activated, in particular automatically, and/or the vehicle is at a standstill and the parking lock is actively engaged and the amount of the ascertained gradient value and/or ascertained inclination value falls below the amount of a determined second inclination threshold value, it is permitted and/or possible for the driver to release and/or deactivate the parking brake at any time.

It is different in the event that the parking brake is already activated, in particular automatically, and/or the vehicle is at a standstill and the parking lock is actively engaged and the amount of the ascertained gradient value and/or ascertained inclination value exceeds the amount of a determined second inclination threshold value, because then it is not permitted, i.e., it is prevented, for the driver to automatically release and/or deactivate the parking brake at least as long as the parking lock is actively engaged in the transmission. This is particularly advantageous if the vehicle is standing on a strongly inclined road, because in this case it is not possible for the driver to deactivate the parking brake, so that a rolling in and/or an interlocking of the parking lock already engaged in the transmission is prevented.

In particular, the parking brake can only be deactivated by the driver when the parking lock is actively disengaged in or on the transmission. This prevents rolling into the parking lock if the roadway has a steep decline/gradient.

It is also conceivable that, if it is permitted and/or possible at any time for the driver, as described above, to release and/or deactivate the parking brake, specifically when the amount of the ascertained gradient value falls below the amount of a determined second inclination threshold value, the parking lock is then also automatically actively disengaged in conjunction with the deactivation of the parking brake, in particular shortly before but at least at the same time.

As already described above, the examples can be realized individually, but also together in combination.

Furthermore, the methods according to the invention can now all be designed in that an actively engaged parking lock is automatically disengaged when the driver operates the accelerator when a gear is frictionally, actively engaged in the transmission.

It is also conceivable that the hydraulic brake system is also activated to continue to brake the vehicle until the vehicle comes to a standstill, in particular below a determined vehicle speed threshold value.

The respective determined vehicle speed threshold value below which, in particular, the parking brake is automatically activated in order to continue to brake the vehicle amounts in particular to 3 km/h.

The above-mentioned first gradient value and/or inclination threshold value corresponds in particular to a 5% road gradient (or a corresponding road decline) and/or the above-mentioned determined second gradient value and/or inclination threshold value corresponds to a 15% road gradient (or a corresponding road decline).

It is conceivable that an activated parking brake is also automatically deactivated when the parking lock is deactivated, in particular when the parking lock button is deactivated accordingly, in particular when the parking lock is actively disengaged.

The disadvantages mentioned above are in any case avoided accordingly and/or specific advantages are achieved if the respective, previously described method is realized in a vehicle, in particular in a motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
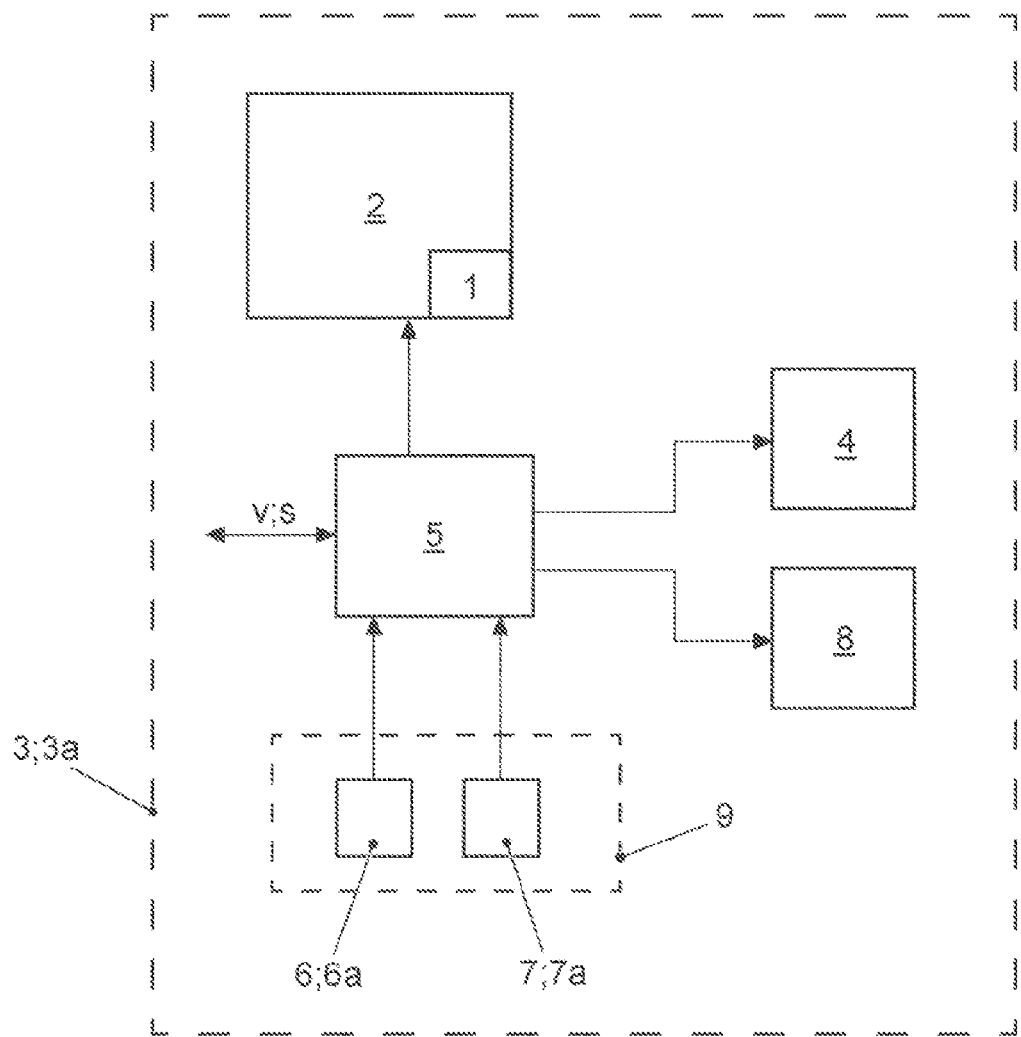
FIG. 1 is a schematic representation for carrying out the inventive method for a vehicle, in particular for a motor vehicle.

FIG. 1 initially shows the essential components for the realization of the inventive method for controlling the engagement and/or disengagement of a parking lock 1 of a transmission 2 of a vehicle, in particular a motor vehicle 3a, which is only indicated by a dashed line 3.

The vehicle 3, i.e., the motor vehicle 3a, has a parking lock 1 and a transmission 2. In particular, the parking lock 1 is at least partially arranged within the transmission 2. Furthermore, the vehicle 3, i.e., the motor vehicle 3a, has a parking brake 4 and a control unit 5. The parking lock 1 can be actively engaged or disengaged by means of at least one activatable parking lock actuator, in the transmission 2, in this case in particular in an automatic transmission 2a, in particular when the transmission 2 is in the neutral position "N". In this case, the parking lock 1 can be actively engaged in and/or on the transmission 2, this means, in particular, that the parking lock 1 and/or the necessary mechanical components are at least partially arranged accordingly in and/or on the transmission 2 or in the area of the transmission 2.

For the ascertainment of a driver demand, namely the driver demand that the vehicle 3 be secured against unintentionally rolling away and/or against unintentional onward travel, the vehicle 3 has at least one device 6 for activating the parking lock 1, in particular a parking lock button 6a, and/or a particular positioning capability for a selector lever (position "P"), and at least one device 7 for activating the parking brake 4, in particular at least one parking brake button 7a (EPB button). The device 6, in particular the parking lock button 6a and/or the device 7, in particular the parking brake button 7a, can be manually actuated by the driver, in particular pressed, in particular inside the passenger compartment.

By means of the control unit 5, the control of the active engagement and disengagement of the parking lock 1 in the transmission 2 is controlled, in particular automatically controlled. In this case, in particular, present values of multiple driving parameters are transmitted to the control unit 5 and/or present values of multiple driving parameters (v, s) are ascertained by the control unit 5. At least one present determined driving parameter (v) is transmitted to the control unit and/or ascertained by the control unit 5, wherein the present vehicle speed v of the vehicle is ascertained as a determined first driving parameter. The vehicle speed v is ascertained by the control unit 5, in particular permanently/continuously, but at least then when the driver desires to secure the vehicle 3 against rolling away and/or against onward travel, and at least then, the vehicle speed v is ascertained when the driver has actuated the device 6, in particular the parking lock button 6a, in order to activate the parking lock 1, i.e., when said driver desires to engage the parking lock 1 in the transmission 2.

However, the parking lock 1 is only actively engaged in and/or on the transmission 2 when the vehicle 3 is at a standstill and/or the present vehicle speed v is substantially zero. This applies substantially to all examples of the method; this may be pointed out. The term "is substantially zero" means that even very low vehicle speeds, such as less than or equal to 0.05 km/h, and/or corresponding measurement inaccuracies in this area, should be or are still included in the term "is substantially zero".

In the following, a first and then a second example of the inventive method is described. Here, the first example is substantially represented by the path I in FIG. 2 on the left, and the second example by the path II in FIG. 2 on the right, wherein both examples can be combined with each other accordingly to form a third example, as mentioned above.

Figure 2:
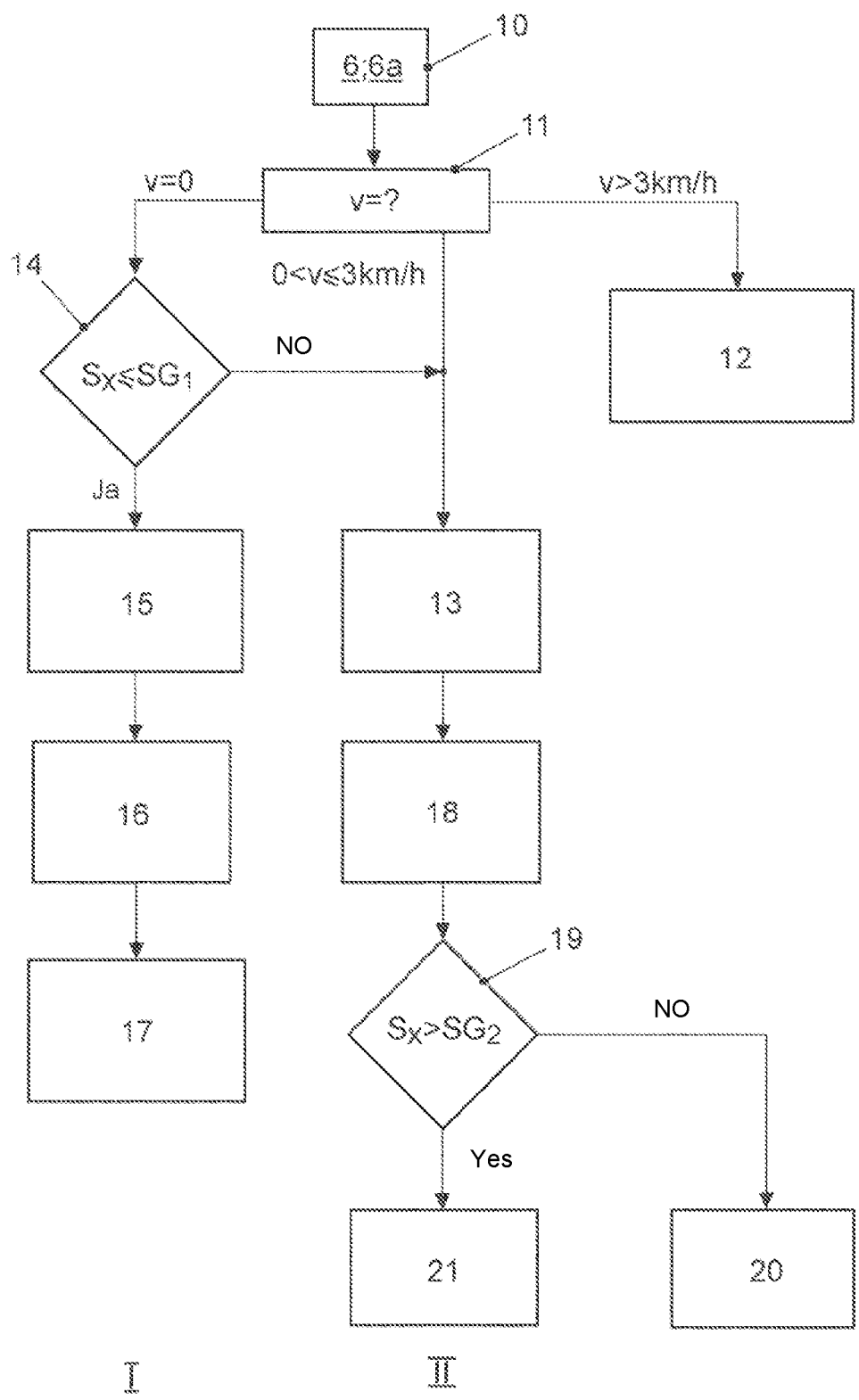
FIG. 2 is a schematic representation of a circuit diagram for carrying out the inventive method according to a first example, represented in FIG. 2 by path I, or according to a second example, represented in FIG. 2 on the right by path II, wherein these first and second examples can be carried out in combination with each other (complete view of FIG. 2, i.e., path I and path II in combination).

However, the examples or the respective inventive methods substantially also have in common that—as FIG. 2 shows—the driver first actuates the device 6, in particular the parking lock button 6a, at the beginning of the method, represented here by the reference sign "10", because said driver desires to secure the vehicle 3 against rolling away and/or onward travel, in particular because said driver desires to actively engage the parking lock 1 in the transmission 2 (shown in FIG. 2 at the top).

In a first method step 11, the present vehicle speed v is ascertained and/or the present vehicle speed v is checked. However, the parking lock 1 is only actively engaged in and/or on the transmission 2, which in turn is substantially the same for all methods, when the vehicle 3 is at a standstill and/or the present vehicle speed v is substantially zero. If the vehicle 3 has not yet reached its standstill or if the present vehicle speed v exceeds a determined vehicle speed threshold value, if in particular the vehicle speed is greater than 3 km/h, the active engagement of the parking lock 1 in and/or on the transmission 2 is automatically prevented by means of the control unit 5, although the driver has already actuated the device 6, in particular the parking lock button 6a. This is shown in FIG. 2 by method step 12 there. There is no active engagement of the parking lock 1. If the vehicle 3 has not yet reached its standstill and the present vehicle speed v falls below a determined vehicle speed threshold value, in particular 3 km/h, then the vehicle 3 can continue to be braked by means of the then automatically activated parking brake 4 until said vehicle reaches its standstill and/or until the vehicle speed has reached substantially zero (the latter is represented in particular at the beginning of path II in FIG. 2, center, by method step 13. In particular, the vehicle 3 continues to be braked by the then automatically activated parking brake 4 when the vehicle speed v is less than or equal to 3 km/h). Or the latter, again expressed differently, only when the vehicle speed v of the vehicle 3 reaches or falls below the determined vehicle speed threshold value, in particular reaches or falls below 3 km/h, can the vehicle 3 be continued to be braked to a standstill and/or until the vehicle speed v is substantially zero by means of an automatically activated parking brake 4, represented by method step 13.

In the following, the respective examples of the inventive method will now be described in more detail:

The disadvantages mentioned above are now initially avoided in the first example of the method in that, as a second driving parameter, the present gradient s of the roadway and/or the longitudinal inclination of the vehicle 3 is ascertained and/or calculated, and that on the basis of the determined, in particular present gradient value $S_x$ and/or the determined longitudinal inclination value of the vehicle 3, it is decided and/or checked whether a hydraulic brake system 8 of the vehicle 3 is activated. The preferred first example of the method is shown in FIG. 2, on the left, specifically shown here in path I. In the event that the vehicle speed v is substantially zero and/or the vehicle 3 is at a standstill and the amount of the ascertained gradient value and/or ascertained inclination value $S_x$ falls below or is equal to the amount of a determined first inclination threshold value $SG_1$, the hydraulic brake system 8 is automatically activated, in particular for a maximum of 2 seconds. As a result, when at a standstill, the vehicle 3 is then secured or "firmly braked" against rolling away by the hydraulic brake system 8. After this securing or after the activation of the hydraulic brake system 8, the parking lock 1 is then automatically actively engaged in and/or on the transmission 2. After the parking lock 1 is actively engaged, the hydraulic brake system 8 is automatically deactivated again, in particular after the 2 seconds mentioned above. In particular, no parking brake 4 is automatically activated to further secure the vehicle 3 against rolling away, because the vehicle 3 is in particular secured against rolling away by the actively engaged parking lock 1. The aforementioned method steps of the first example are schematically represented in particular by path I in FIG. 2, on the left. In method step 14, it is therefore checked whether the ascertained gradient value and/or ascertained inclination value $S_x$ is less than or equal to the amount of the determined first inclination threshold value $SG_1$. In the event that this condition is fulfilled, the hydraulic brake system 8 is then automatically activated in method step 15. Thereafter, the parking lock 1 is then automatically actively engaged in or on the transmission 2 in method step 16. After the parking lock 1 is actively engaged, the hydraulic brake system 8 is automatically deactivated again in method step 17. The hydraulic brake system 8 is therefore activated in particular when the amount of the ascertained gradient value and/or ascertained inclination value $S_x$ is less than or equal to the amount of the determined first inclination threshold value $SG_1$.

Before reference is made to the second example of the invention, or before this second example is described in more detail, it may already be pointed out here that in the event that the vehicle speed v is substantially zero and/or the vehicle 3 is at a standstill and the amount of the ascertained gradient value and/or ascertained inclination value $S_x$ exceeds the amount of the determined first inclination threshold value $SG_1$, then the parking brake 4 is automatically activated, i.e., in particular, the hydraulic brake system 8 is not automatically activated, and the branching from path I to path II shown in FIG. 2 takes place. In other words, when the amount of the ascertained gradient value and/or ascertained inclination value $S_x$ is greater than the amount of the determined first inclination threshold value $SG_1$, the hydraulic brake system 8 is not activated and the parking brake 4 can be activated. Method step 13 can then be carried out. In particular, this branching also shows here, at least partially, the combination of the first and second examples.

In the following, the second example of the inventive method will now be described in more detail:

In the second example of the method according to the invention, the device 6 or the parking lock button 6a is initially also actuated by the driver (cf. step 10), wherein the parking lock 1 is then not yet actively engaged in the transmission 2. First, the vehicle speed v is ascertained (cf. method step 11). If the vehicle speed v exceeds a determined vehicle speed threshold value, in particular greater than 3 km/h, the parking lock 1 is automatically prevented from actively engaging in the transmission 2 (cf. method step 12). If the vehicle speed v falls below the determined vehicle speed threshold value, in particular less than 3 km/h, but the vehicle 3 is not yet at a standstill, then the parking brake 4 is automatically activated in order to continue to brake the vehicle 3. This is shown in particular in path II of FIG. 2 (cf. method step 13). When the vehicle 3 reaches a standstill or when the vehicle speed v is substantially zero, the parking lock 1 is automatically actively engaged in the transmission 2. This is represented by method step 18.

The disadvantages mentioned above are avoided by the second example of the method, first by the fact that, as a second driving parameter, the present gradient s of the roadway and/or the longitudinal inclination of the vehicle 3 is ascertained and/or calculated and that on the basis of the ascertained gradient value $S_x$ and/or the ascertained longitudinal inclination value of the vehicle 3 it is decided and/or checked whether an already activated parking brake 4 can be deactivated again by the driver. This has special advantages, in particular in the case of steeper gradient and/or a greater road decline, which will be explained more closely below.

In the event that the parking brake 4 is already activated, in particular automatically, and/or the vehicle 3 is at a standstill and the parking lock 1 is actively engaged in the transmission 2 and the amount of the determined gradient value and/or ascertained inclination value $S_x$ falls below or is equal to the amount of a determined second inclination threshold value $SG_2$, it is permitted and/or possible for the driver to release and/or deactivate the parking brake 4, in particular by actuating the device 7, in particular the parking brake button 7a, at any time. This is shown graphically in FIG. 2, at the bottom right, where the amount of the ascertained present gradient value and/or ascertained inclination value $S_x$ then just happens to not be greater than the second inclination threshold value $SG_2$, i.e., the query shown here is denied, so that then the driver is permitted to release the parking brake 4 by means of the control unit 5 when said driver actuates the device 7 accordingly, in particular the parking brake button 7a. In method step 19, therefore, it is checked whether the ascertained gradient value and/or ascertained inclination value $S_x$ is greater than the second inclination threshold value $SG_2$. If this check/query is denied, then method step 20 is carried out and the driver is permitted to release the parking brake 4 by means of the control unit 5, in particular when said driver actuates the device 7 or the parking brake button 7a accordingly, in particular the parking brake 4 can then be deactivated accordingly. Again, in other words, when the amount of the ascertained gradient value and/or ascertained inclination value $S_x$ is less than or equal to the amount of the determined second inclination threshold value $SG_2$, then it is permitted and/or possible for the driver to release or deactivate the parking brake 4, in particular by actuating the parking brake button 7a, at any time by means of the control unit 5.

In the event that the parking brake 4 is, in particular, automatically activated and/or the vehicle 3 is at a standstill and the parking lock 1 is actively engaged and the amount of the ascertained gradient value and/or ascertained inclination value $S_x$ exceeds the amount of a determined second inclination threshold value $SG_2$, the driver is not permitted and/or is automatically prevented from releasing and/or deactivating the parking brake 4 at least as long as the parking lock 1 is actively engaged in the transmission 2. This is shown graphically in FIG. 2 in path II at the bottom (center) or is represented by the method step 21.

As a result, if the gradient of the road or the longitudinal inclination of the vehicle 3 is correspondingly steep, then the driver cannot deactivate the parking brake 4, in particular not manually, until the parking lock 1 is also actively disengaged in the transmission 2. This prevents a rolling into an actively engaged parking lock 1.

In principle, it is also conceivable that the parking brake 4 can only be deactivated by the driver when the parking lock 1 is actively disengaged in and/or on the transmission 2. It is conceivable that when the parking brake 4 is deactivated by the driver, the parking lock 1 is also automatically actively disengaged in the transmission 2, in particular shortly before or at least at the same time, in particular to prevent a rolling into an actively engaged parking lock 1. For this purpose, a common button element 9 could then be provided.

The steps shown in path I and path II can be implemented together. This is shown, in particular, by the branch between path I and path II shown in FIG. 2 on the top left, namely that it is possible to "jump" from path I to path II when the amount of the ascertained gradient value $S_x$ is greater than the first determined inclination threshold value $SG_1$.

In general, and this relates to all three examples of the inventive method, an actively engaged parking lock 1 can be automatically disengaged when the driver operates the accelerator when a gear is frictionally, actively engaged in the transmission 2. It is also conceivable that for continuing to brake the vehicle 3 until the vehicle 3 standstill is reached, in particular when the vehicle speed v is lower than the determined vehicle speed threshold value, in particular less than 3 km/h, the hydraulic brake system 8 is activated for this purpose.

As already mentioned above, the determined vehicle speed threshold value is in particular 3 km/h. Other values are conceivable, which are in particular between the values 2 to 5 km/h.

Preferably, the determined first gradient value and/or inclination threshold value $SG_1$ corresponds to a 5% road gradient (or a corresponding road decline) and/or the determined second gradient value and/or inclination threshold value $SG_2$ corresponds to a 15% road gradient (or a corresponding road decline).

It is also conceivable that by means of the control unit 5, an already activated parking brake 4 is also automatically deactivated at the same time when the parking lock 1 is deactivated by the driver, in particular when the parking lock button 6a is actuated, i.e., in particular with an active disengagement of the parking lock 1. This may also be pointed out.

As a result, by means of the first and second example of the invention, but in particular also by means of the third example of the invention, which combines the first and second example, corresponding advantages are achieved, and corresponding disadvantages known from the prior art are avoided.

It is conceivable, it may be pointed out, that the devices 6 and 7, the buttons 6a and 7a, are designed as "software buttons" and/or even that a corresponding voice control by the driver is implemented.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling an engagement and/or disengagement of a parking lock of a transmission of a vehicle, wherein the vehicle comprises the parking lock, a parking brake and a control unit, the method comprising:
    actively engaging or disengaging the parking lock in or on the transmission;
    securing, for the ascertainment of a driver demand, the vehicle against rolling away or against onward travel, wherein the vehicle has at least one device for activating the parking lock and at least one device for activating the parking brake;
    controlling the active engagement and disengagement of the parking lock in or on the transmission via the control unit; and
    transmitting at least one determined first driving parameter to the control unit and/or the at least one determined first driving parameter is ascertained by the control unit,
    wherein, the at least one determined first driving parameter includes a present vehicle speed of the vehicle that is ascertained and/or calculated when the driver has actuated the device for activating the parking lock,
    wherein, the parking lock is actively engaged in or on the transmission only when the vehicle is at a standstill or the present vehicle speed is substantially zero,
    wherein, when the vehicle has not yet reached the standstill and the present vehicle speed exceeds a determined vehicle speed threshold value, the active engagement of the parking lock in or on the transmission is prevented, and/or, when the vehicle has not yet reached the standstill and the present vehicle speed falls below the determined vehicle speed threshold value, then the vehicle automatically activates the parking brake and continues to be braked until the standstill is reached or until the present vehicle speed of the vehicle has reached substantially zero,
    wherein, as a second driving parameter, a present gradient value of the roadway and/or a longitudinal inclination value of the vehicle is ascertained and/or calculated,
    wherein, on the basis of the gradient value and/or the longitudinal inclination value of the vehicle, it is decided and/or checked whether a hydraulic brake system of the vehicle is activated,
    wherein, when the present vehicle speed is substantially zero or the vehicle is at the standstill and the gradient value and/or the longitudinal inclination value falls below or is equal to a determined first inclination threshold value, then the hydraulic brake system is automatically activated for a maximum of 2 seconds,
    wherein, after the hydraulic brake system is activated, the parking lock is automatically actively engaged in or on the transmission, and
    wherein, after the parking lock is actively engaged, the hydraulic brake system is automatically deactivated again, and no parking brake is then automatically activated for further securing the vehicle against rolling away, and/or, the parking brake, that is already activated, is automatically deactivated again.

2. The method according to claim 1, wherein, when the present vehicle speed is substantially zero or the vehicle is at the standstill and the gradient value and/or the longitudinal inclination value exceeds a determined first inclination threshold value, then the parking brake is automatically activated.

3. The method according to claim 1, wherein an actively engaged parking lock is automatically disengaged when the driver operates the accelerator when a gear is frictionally, actively engaged in the transmission.

4. The method according to claim 1, wherein, for continuing to brake the vehicle until the standstill of the vehicle is reached, the hydraulic brake system is activated.

5. The method according to claim 1, wherein the determined vehicle speed threshold value is 3 km/h.

6. The method according to claim 1, wherein, when a deactivation of the parking lock occurs, with an active disengagement of the parking lock, an activated parking brake is also automatically deactivated at the same time.

7. A method for controlling an engagement and/or disengagement of a parking lock of a transmission of a vehicle, wherein the vehicle comprises the parking lock, a parking brake, and a control unit, wherein the parking lock is adapted to be actively engaged or disengaged in or on the transmission, wherein, for an ascertainment of a driver demand, to secure the vehicle against rolling away or against onward travel, the vehicle has at least one device for activating the parking lock, and at least one device for activating the parking brake, wherein the control of the active engagement and disengagement of the parking lock in or on the transmission is controlled by the control unit, the method comprising:

transmitting or ascertaining at least one determined first driving parameter to or by the control unit, the at least one determined first driving parameter including a present vehicle speed of the vehicle;

ascertaining and/or calculating the present vehicle speed of the vehicle when the driver has actuated the device for activating the parking lock;

actively engaging the parking lock in or on the transmission only when the vehicle is at a standstill or the present vehicle speed is substantially zero; and preventing, when the vehicle has not yet reached the standstill and the present vehicle speed exceeds a determined vehicle speed threshold value, the active engagement of the parking lock in or on the transmission is prevented and/or when the vehicle has not yet reached the standstill and the present vehicle speed falls below the determined vehicle speed threshold value, then the vehicle automatically activates the parking brake and continues to be braked until the standstill is reached or until the present vehicle speed of the vehicle has reached substantially zero; and ascertaining and/or calculating, as a second driving parameter, a present gradient value of the roadway and/or a longitudinal inclination value of the vehicle, and based on the gradient value and/or the longitudinal inclination value of the vehicle, it is decided and/or checked whether the already activated parking brake should be deactivated by the driver, wherein, when the present vehicle speed is substantially zero or the vehicle is at the standstill and the gradient value and/or the longitudinal inclination value is greater than a determined first inclination threshold value or when the present vehicle speed has not yet reached the standstill but falls below the determined vehicle speed threshold value, then the parking brake is automatically activated, and wherein, when the parking brake is already automatically activated, the vehicle is at a standstill and the parking lock is actively engaged and the gradient value and/or the longitudinal inclination value falls below or is equal to a determined second inclination threshold value, it is permitted for the driver to release and/or deactivate the parking brake at any time.

8. The method according to claim 7, wherein, when the parking brake is deactivated by the driver, the parking lock is also automatically actively disengaged.

9. The method according to claim 7, wherein the determined first inclination threshold value corresponds to a 5% road gradient and the determined second inclination threshold value corresponds to a 15% road gradient.

10. A method for controlling an engagement and/or disengagement of a parking lock of a transmission of a vehicle, wherein the vehicle comprises the parking lock, a parking brake, and a control unit, wherein the parking lock is adapted to be actively engaged or disengaged in or on the transmission, wherein, for an ascertainment of a driver demand, to secure the vehicle against rolling away or against onward travel, the vehicle has at least one device for activating the parking lock, and at least one device for activating the parking brake, wherein the control of the active engagement and disengagement of the parking lock in or on the transmission is controlled by the control unit, the method comprising:

transmitting or ascertaining at least one determined first driving parameter to or by the control unit, the at least one determined first driving parameter including a present vehicle speed of the vehicle;

ascertaining and/or calculating the present vehicle speed of the vehicle when the driver has actuated the device for activating the parking lock;

actively engaging the parking lock in or on the transmission only when the vehicle is at a standstill or the present vehicle speed is substantially zero; and preventing, when the vehicle has not yet reached the standstill and the present vehicle speed exceeds a determined vehicle speed threshold value, the active engagement of the parking lock in or on the transmission is prevented and/or when the vehicle has not yet reached the standstill and the present vehicle speed falls below the determined vehicle speed threshold value, then the vehicle automatically activates the parking brake and continues to be braked until the standstill is reached or until the present vehicle speed of the vehicle has reached substantially zero; and ascertaining and/or calculating, as a second driving parameter, a present gradient value of the roadway and/or a longitudinal inclination value of the vehicle, and based on the gradient value and/or the longitudinal inclination value of the vehicle, it is decided and/or checked whether the already activated parking brake should be deactivated by the driver, wherein, when the present vehicle speed is substantially zero or the vehicle is at the standstill and the gradient value and/or the longitudinal inclination value is greater than a determined first inclination threshold value or when the present vehicle speed has not yet reached the standstill but falls below the determined vehicle speed threshold value, then the parking brake is automatically activated, and wherein, when the parking brake is already automatically activated, the vehicle is at the standstill and the parking lock is actively engaged and the gradient value and/or the longitudinal inclination value exceeds a determined second inclination threshold value, the driver is not automatically permitted to release and/or deactivate the parking brake at least as long as the parking lock is actively engaged.

11. The method according to claim 10, wherein the parking brake is deactivated by the driver only when the parking lock is actively disengaged in or on the transmission.

* * * * *